(12) United States Patent
Kurokawa et al.

(10) Patent No.: US 11,671,284 B2
(45) Date of Patent: Jun. 6, 2023

(54) VEHICLE ONBOARD NETWORK SYSTEM

(71) Applicants: Mazda Motor Corporation, Hiroshima (JP); Toyota Jidosha Kabushiki Kaisha, Toyota (JP)

(72) Inventors: Yoshimasa Kurokawa, Hiroshima (JP); Tetsuhiro Yamashita, Hiroshima (JP); Takahiro Hirano, Toyota (JP)

(73) Assignees: MAZDA MOTOR CORPORATION, Hiroshima (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/638,856

(22) PCT Filed: Aug. 6, 2020

(86) PCT No.: PCT/JP2020/030221
§ 371 (c)(1),
(2) Date: Feb. 28, 2022

(87) PCT Pub. No.: WO2021/039350
PCT Pub. Date: Mar. 4, 2021

(65) Prior Publication Data
US 2022/0337453 A1     Oct. 20, 2022

(30) Foreign Application Priority Data
Aug. 30, 2019  (JP) .............................. JP2019-158739

(51) Int. Cl.
*H04L 12/66* (2006.01)
*H04L 12/40* (2006.01)
(Continued)

(52) U.S. Cl.
CPC .......... *H04L 12/66* (2013.01); *B60R 16/0231* (2013.01); *B60W 60/00* (2020.02);
(Continued)

(58) Field of Classification Search
None
See application file for complete search history.

(56) References Cited

U.S. PATENT DOCUMENTS

2009/0062979 A1   3/2009  Sakane
2015/0138954 A1*  5/2015  Ross ................... H04L 41/0654
                                              370/389
(Continued)

FOREIGN PATENT DOCUMENTS

JP      8-228197 A    9/1996
JP    2001-43475 A    2/2001
(Continued)

OTHER PUBLICATIONS

International Search Report and Written Opinion dated Sep. 29, 2020, received for PCT Application PCT/JP2020/030221, Filed on Aug. 6, 2020, 9 pages including English Translation.

*Primary Examiner* — Angela Nguyen
(74) *Attorney, Agent, or Firm* — Xsensus LLP

(57) ABSTRACT

A central control device and a plurality of relay devices constitute a backbone network. Each of the relay device includes: a backbone-side communication port connected to a backbone network; a plurality of device-side communication ports configured to input and output a signal to/from an onboard device; and a first interface conversion device configured to perform interface conversion between the backbone-side communication port and the device-side communication ports. The device-side communication ports include a plurality of general-purpose communication ports to which a common input circuit and/or output circuit is connected. A predetermined first onboard device is directly connected to the general-purpose communication ports, whereas a predetermined second onboard device is con- (Continued)

nected to the general-purpose communication ports via a predetermined first onboard device.

5 Claims, 5 Drawing Sheets

(51) Int. Cl.
*B60W 60/00* (2020.01)
*B60R 16/023* (2006.01)

(52) U.S. Cl.
CPC ............... *H04L 2012/40215* (2013.01); *H04L 2012/40273* (2013.01)

(56) References Cited

U.S. PATENT DOCUMENTS

| | | |
|---|---|---|
| 2019/0045034 A1 | 2/2019 | Alam |
| 2019/0058611 A1 | 2/2019 | Maeda et al. |
| 2019/0268368 A1* | 8/2019 | Zinner ................ H04L 63/1433 |
| 2020/0145293 A1 | 5/2020 | Terazawa et al. |
| 2021/0126917 A1* | 4/2021 | Lin ....................... H04W 40/02 |
| 2021/0184886 A1 | 6/2021 | Maeda et al. |

FOREIGN PATENT DOCUMENTS

| | | |
|---|---|---|
| JP | 2006-270878 A | 10/2006 |
| JP | 2009-56817 A | 3/2009 |
| JP | 2011-182123 A | 9/2011 |
| JP | 2017-212725 A | 11/2017 |
| JP | 2019-29992 A | 2/2019 |

\* cited by examiner

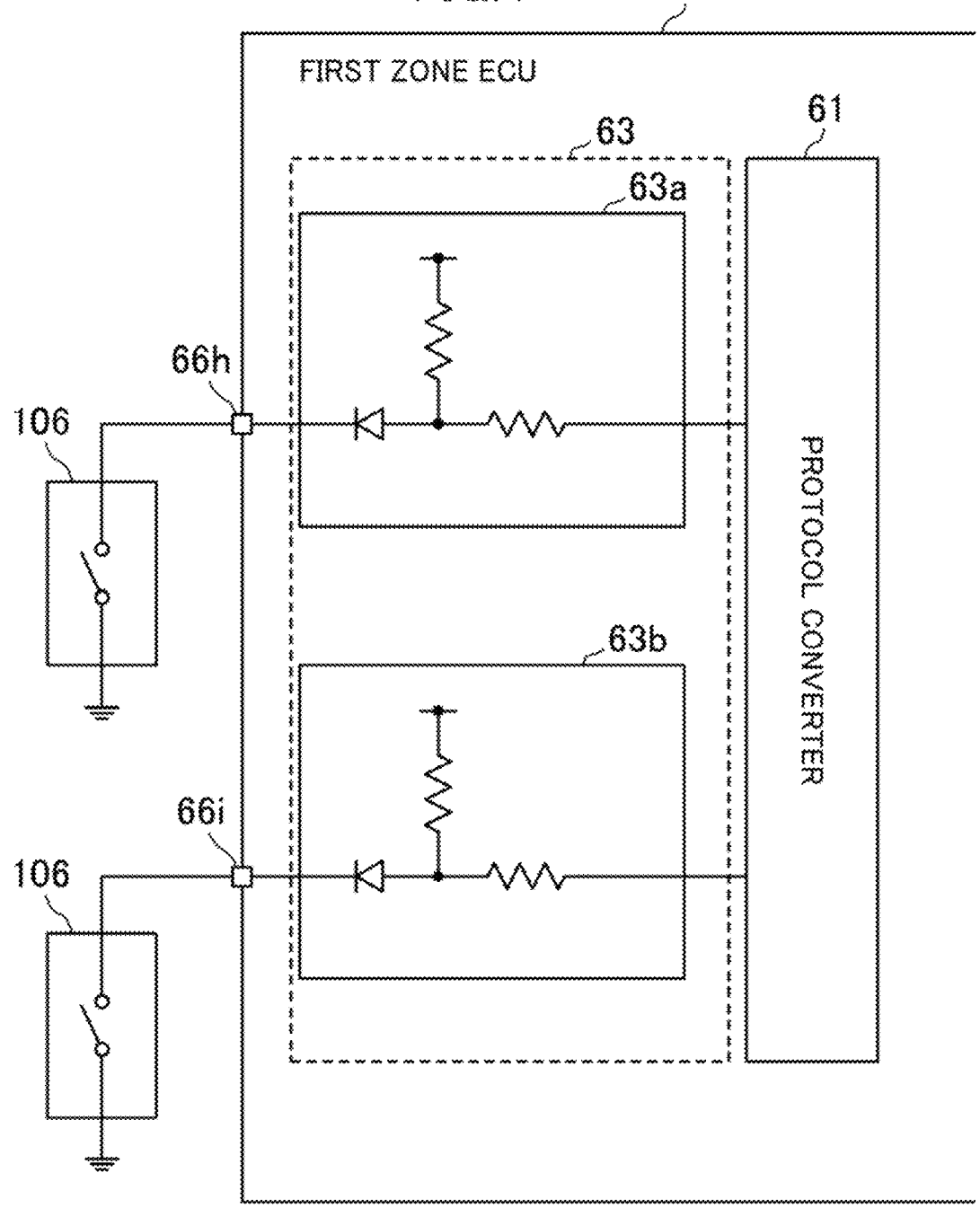

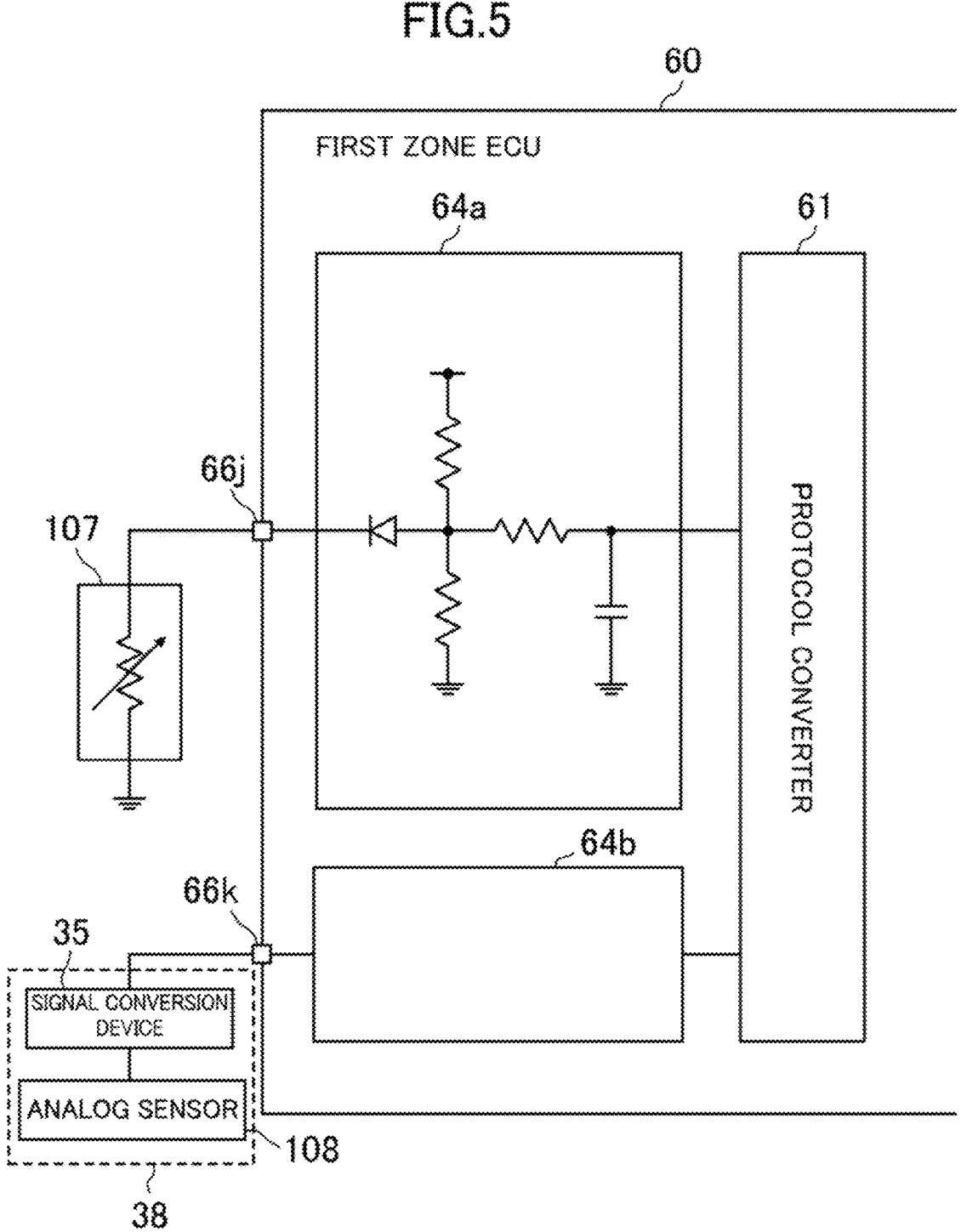

VEHICLE ONBOARD NETWORK SYSTEM

CROSS-REFERENCE TO RELATED APPLICATIONS

The present application is based on PCT/JP2020/030221 filed on Aug. 6, 2020, and claims priority to Japanese Application No. 2019-158739 filed on Aug. 30, 2019, the entire contents of each are incorporated herein by reference.

TECHNICAL FIELD

The technique disclosed here belongs to a technical field related to a vehicle onboard network system.

BACKGROUND ART

Patent Document 1 describes a configuration of a vehicle onboard network including hub devices (relays) such as a central gateway and an Ethernet (registered trademark)-CAN gateway. A plurality of ECUs are connected to the central gateway via Ethernet.

Patent Document 2 describes a technique of providing a gateway and a network hub (HUB) for relaying data transmission and reception between nodes of different networks in a vehicle onboard network system.

CITATION LIST

Patent Document

Patent Document 1: Japanese Patent Application Publication No. 2019-29992
Patent Document 2: Japanese Patent Application Publication No. 2017-212725

SUMMARY OF THE INVENTION

Technical Problem

In recent years, techniques related to vehicle automation for controlling vehicles depending on environment information inside and outside the vehicles, driver information, and so forth, including autonomous driving systems, have been developed. In the future, a computation function for autonomous driving and a control function for actuators are expected to be integrated in a central processing unit that centrally manages operations of the entire vehicle.

To such a central processing unit in which functions are integrated, if sensors and actuators are directly connected, an enormous amount of signal lines is required, and thus, the direct connection is not practical. In view of this, Patent Document 2 proposes a configuration of an onboard network by providing relay devices functioning as a network hub device and a gateway device.

Actuators mounted on a vehicle have various input/output circuit configurations, signal modes, and so forth. Therefore, interfaces between the relay devices and the actuators are to be devised. Specifically, in a case where a relay device is provided with an interface for a specific actuator, for example, the relay device might be dedicated and complicated, which leads to the possibility of cost increase and other problems.

It is therefore an object of the technique disclosed here to provide a vehicle onboard network system capable of avoiding complication of relay devices and maximizing versatility of the relay devices.

Solution to the Problem

To achieve the object, the technique disclosed here is directed to a vehicle onboard network system including: a central control device configured to centrally manage operation of a vehicle; a plurality of relay devices connected to the central control device in a daisy chain manner via a backbone network through which a digital signal of a predetermined protocol is transmitted, wherein each of the relay devices includes a backbone-side communication port connected to the backbone network, a plurality of device-side communication ports for signal input and output to/from onboard devices, and a first interface conversion device configured to perform interface conversion between the backbone-side communication port and the plurality of device-side communication ports, the plurality of device-side communication ports include a plurality of general-purpose communication ports to which a common input circuit and/or output circuit is connected, and a predetermined first onboard device is directly connected to a first general-purpose communication port included in the general-purpose communication ports, whereas a second interface conversion device configured to perform interface conversion is disposed between a second general-purpose communication port and a predetermined second onboard device, the second general-purpose communication port being included in the general-purpose communication ports.

In this aspect, in the vehicle onboard network system, each of the relay devices includes a plurality of general-purpose communication ports to which a common input circuit and/or a common output circuit is connected. With the communication port serving as a general-purpose port as described above, specialization and complication of the relay devices can be avoided. On the other hand, there are a variety of interfaces of onboard devices, as described above. In view of this, in the technique disclosed here, an onboard device (first onboard device) directly connectable to a general-purpose communication port is directly connected to the general-purpose communication port, whereas for an onboard device that is difficult to connect to a general-purpose communication port, a second interface device configured to perform interface conversion for the onboard device is interposed between the onboard device and the general-purpose communication port. This can avoid complication of the relay devices and maximize versatility of the relay devices.

In the vehicle onboard network system of this aspect, the first interface conversion device may include an analog-to-digital conversion circuit configured to convert the digital signal to an analog signal, the general-purpose communication ports may be analog ports to/from each of which the analog signal is input or output, and the second interface conversion device may include a regulator circuit disposed between the general-purpose communication port and the predetermined second onboard device.

With this configuration, analog devices having different driving capacities can be connected to a common communication port.

In the vehicle onboard network system of this aspect, the second interface conversion device and the second onboard device may be configured as one unit.

In the vehicle onboard network system of this aspect, the second onboard device may include a sensor and an actuator, and the vehicle onboard network system may further include an autonomous control circuit configured to autonomously control the actuator based on an output signal from the sensor with respect to a predetermined specific operation.

Advantages of the Invention

As described above, the technique disclosed here can avoid complication of relay devices and maximize versatility of the relay devices.

BRIEF DESCRIPTION OF THE DRAWINGS

FIG. 4 is a circuit diagram illustrating another example of the signal converter.

FIG. 5 is a circuit diagram illustrating yet another example of the signal converter.

DESCRIPTION OF EMBODIMENTS

An exemplary embodiment will be specifically described hereinafter with reference to the drawings.

Figure 1:
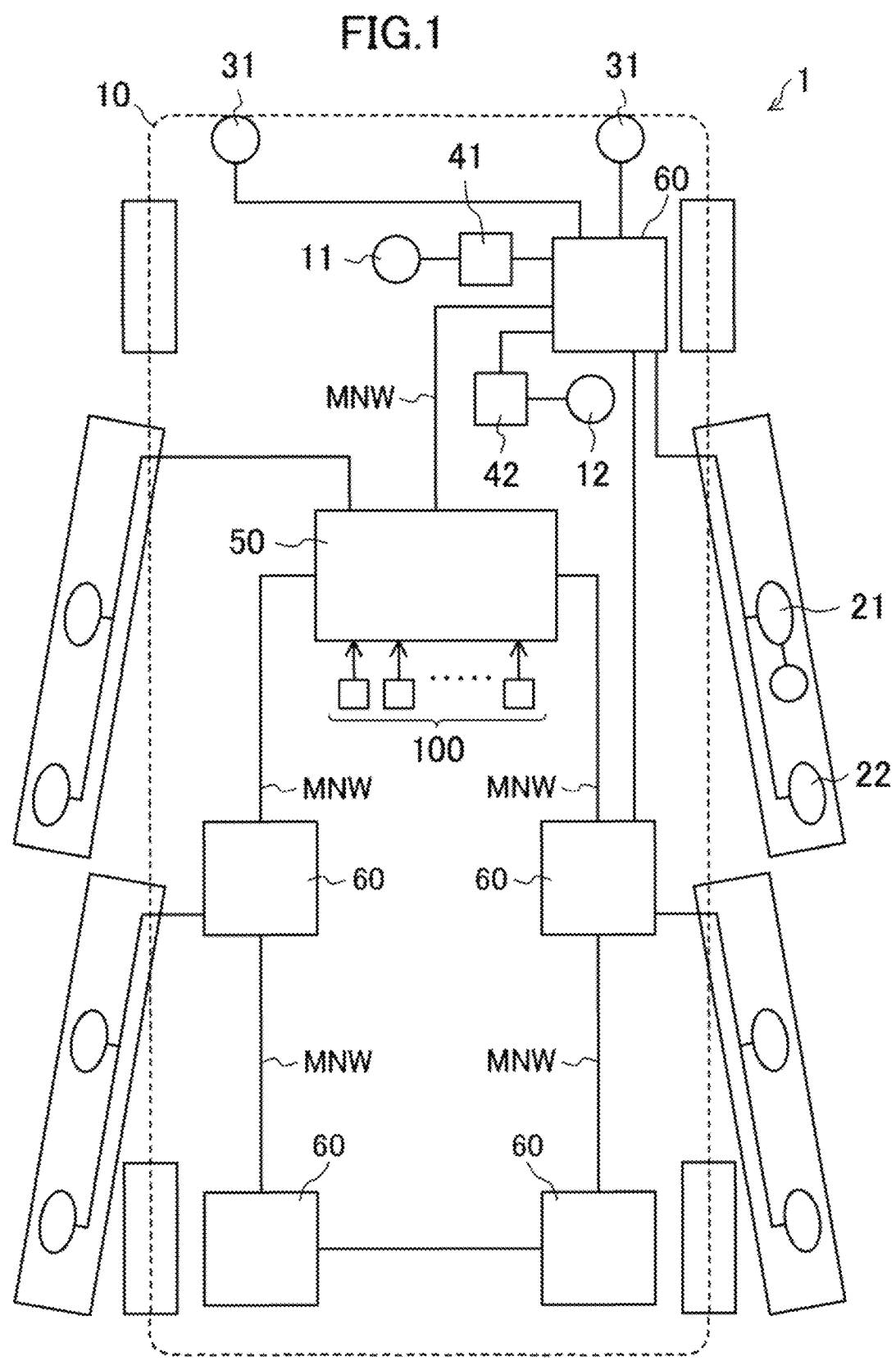
FIG. 1 is a schematic view partially illustrating a vehicle onboard network system according to an exemplary embodiment.

FIG. 1 schematically illustrates a part of a vehicle onboard network system 1 according to this embodiment. A vehicle 10 on which the vehicle onboard network system 1 is mounted is an automobile enabling assisted driving with assistance to driver's operation and autonomous driving without driver's operation, as well as manual driving by drive's operation. In the vehicle 10, a X-by-wire technology of performing electrical control is employed in driving control, braking control, and steering control. That is, in this vehicle, operation of an accelerator pedal, operation of a brake pedal, and operation of a steering wheel are detected by sensors, and actuators are operated in response to control signals based on outputs from these sensors.

As illustrated in FIG. 1, the vehicle onboard network system 1 includes onboard devices of a plurality of types. The onboard devices include a basic device related to basic operation of the vehicle, such as driving, braking, or steering, and a body-related device not related to any of driving, braking, and steering. The onboard device illustrated in FIG. 1 is an example of an onboard device included in the vehicle onboard network system 1, and does not exclude the vehicle onboard network system 1 from including onboard devices other than the onboard devices illustrated in FIG. 1.

Examples of the basic device include a driving-system device 11, an electric power steering device (hereinafter referred to as an EPS device 12), an automatic transmission, an electric brake device, and a dynamic stability control (DSC) device. The driving-system device 11 includes, for example, a throttle valve, a valve opening/closing mechanism, a fuel injection valve, a brake switch, and an air flow sensor. The EPS device 12 includes, for example, an electric motor, a steering switch, a steering warmer, and, in the case of a hydraulic system, an oil pump.

Examples of the body-related device include a power window device (hereinafter referred to as a P/W device 21), a key less entry device 22, a wiper device, a grille shutter, a headlamp 31, a fog lamp, a horn, and a security alarm. The headlamp 31 is an example of a first onboard device.

In this embodiment, the vehicle 1 is divided into plurality of (seven in this embodiment) zones each of which is provided with a zone ECU 60. The central ECU 50 is connected to these zone ECUs 60 in a daisy chain manner, thereby constituting a backbone network MNW. The central ECU 50 is an example of a central control device, and the zone ECUs 60 are examples of relay devices.

The backbone network MNW is configured to transmit a digital signal of a predetermined protocol. The predetermined protocol is not specifically limited, and is, for example, a protocol enabling high-speed large-capacity signal transmission, such as an Ethernet protocol or a CAN-FD protocol. In the following description, a signal transmitted in the backbone network will also be referred to as a backbone network signal. A signal transmission path from each zone ECU 60 to the onboard device will also be referred to as a "device-side network."

Figure 2:
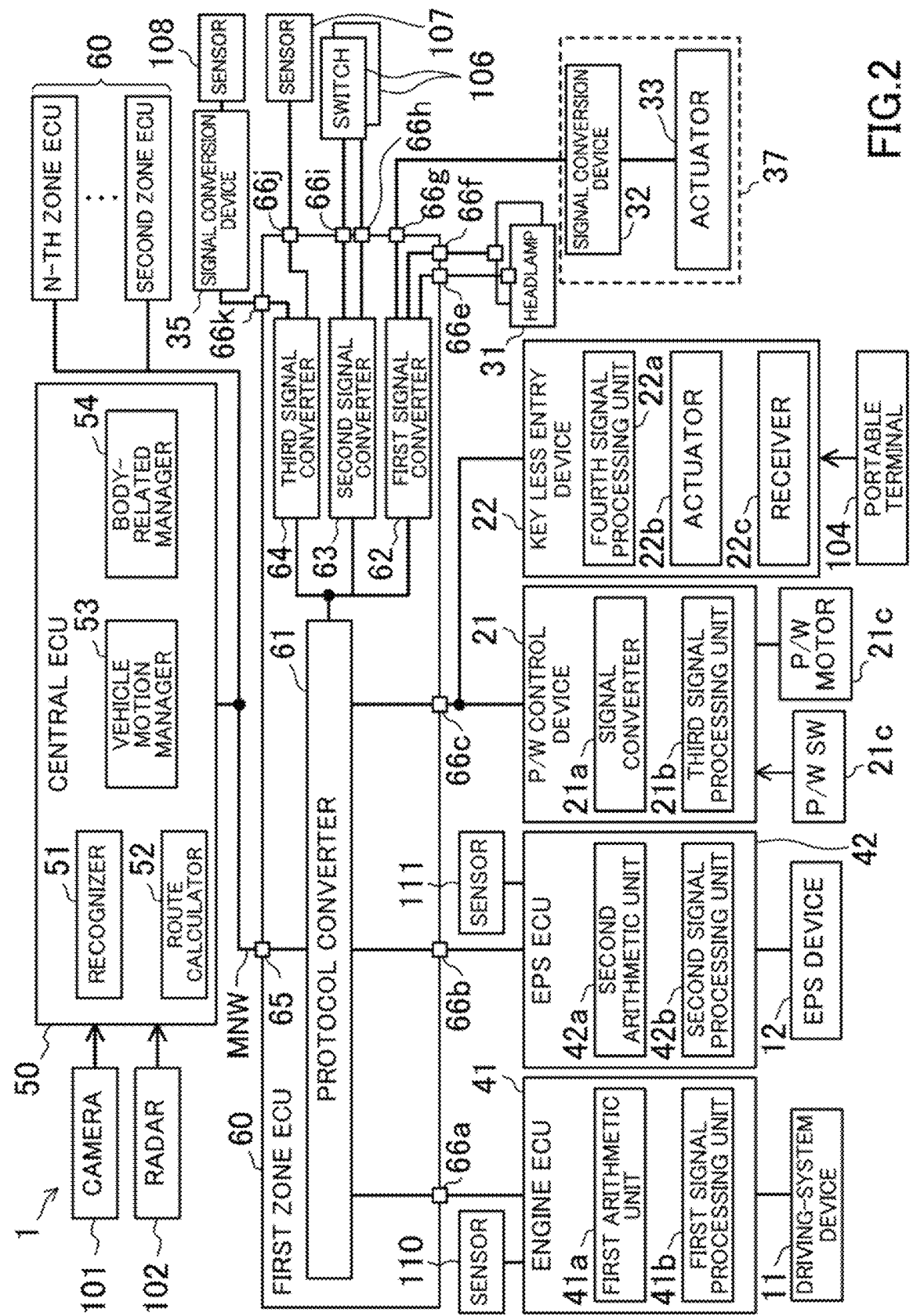
FIG. 2 is a block diagram illustrating a configuration of a central ECU and a zone ECU at a driver's seat side.

As illustrated in FIGS. 1 and 2, the central ECU 50 receives signals from a plurality of sensors 100 mounted on the vehicle 10. The central ECU 50 generates a control signal for controlling onboard devices mounted on the vehicle, based on, for example, environment information inside and outside the vehicle acquired from the sensors 100 and/or a network (not shown) outside the vehicle. In the vehicle onboard network system 1 according to this embodiment, control signals for controlling the onboard devices are basically generated in the central ECU 50, and transmitted from the central ECU 50 to the onboard devices via the zone ECUs 60, for example.

The sensors 100 include a plurality of cameras 101 (see FIG. 2) that are disposed on, for example, the vehicle body and take images of a vehicle-outside environment, and a plurality of radars 102 (see FIG. 2) that are disposed on, for example, the vehicle body and detect an external target or other objects. Examples of the sensors 100 include a position censor, a passenger state sensor, a brake pedal sensor, a steering angle sensor, an accelerator pedal sensor, an outdoor air temperature sensor, an air conditioner pressure sensor, a fuel sensor, a mat sensor, a tank internal pressure sensor, a wheel speed sensor, a brake oil sensor, a Mastervac pressure sensor, a boost sensor, a clutch stroke sensor. The position censor detects a position of the vehicle (vehicle positional information) by using a global positioning system (GPS). The passenger state sensor acquires a state of a passenger of the vehicle including the presence/absence of the passenger. A brake pedal sensor acquires a pressing amount of the brake pedal by a driver of the vehicle. The steering angle sensor acquires a steering angle in steering by the driver of the vehicle. The accelerator pedal sensor acquires a pressing amount of an accelerator pedal by the driver of the vehicle. The sensors 100 here are example of sensors for providing the central ECU 50 with information for controlling operation of the vehicle 10. That is, in this embodiment, it is not excluded that information is input to the central ECU 50 from a sensor except for the sensors described above.

Each of the cameras 101 is disposed to capture an image of the surroundings of the vehicle by 360° in the horizontal direction. Each camera 101 captures an optical image showing a vehicle-outside environment to generate image data. Each camera 101 transmits the generated image data to the central ECU 50.

In a manner similar to the cameras 101, each of the radars 102 is disposed such that the detection range expands around the vehicle by 360° in the horizontal direction. Information acquired by the radars 102 is transmitted to the central ECU 50. The types of the radars 102 are not specifically limited, and a millimeter radar or an infrared radar may be used, for example.

Output signals from the sensors 100 may be directly input to the central ECU 50 in a manner similar to the information from the cameras 101 and the radars 102, or may be input to the central ECU 50 via the zone ECUs 60 or other ECUs, for example.

As illustrated in FIG. 2, the central ECU 50 includes a recognizer 51, a route calculator 52, a vehicle motion manager 53, and a body-related manager 54. The central ECU 50 is, for example, a processor constituted by one or more chips. The recognizer 51 recognizes environment information inside and outside the vehicle by using an artificial intelligence (AT) function, based on environment information from the cameras 101 and the radars 102. The route calculator 52 calculators a route on which the vehicle is to travel, based on vehicle-outside environment information recognized by the recognizer 51. The vehicle motion manager 53 calculates a target output of the basic device based on the vehicle-outside environment information recognized by the recognizer 51 and the route calculated by the route calculator 52. The body-related manager 54 controls operation of the body-related device based on the vehicle-outside environment information recognized by the recognizer 51 and the route calculated by the route calculator 52.

While the vehicle 10 onboard is performing manual driving or assisted driving, the central ECU 50 calculates a driving force, a braking force, and a steering angle to be output by each onboard device based on a detection value of the accelerator pedal sensor, the brake pedal sensor, or sensors of the steering system, for example. The central ECU 50 generates a target signal indicating target values of the calculated driving force, braking force, and steering angle, that is, a driving force, a braking force, and a steering angle to be obtained by each onboard device. In particular, during assisted driving of the vehicle 10, the central ECU 50 takes target motion of the vehicle 10 described later into account in calculating a driving force, a braking force, and a steering angle.

To enable autonomous driving or assisted driving of the vehicle 10, the central ECU 50 recognizes vehicle-outside environment information by the recognizer 51, and calculates a route on which the vehicle 10 is to travel by the route calculator 52. The central ECU 50 determines target motion of the vehicle 10 to follow the route calculated by the route calculator 52.

Specifically, the recognizer 51 receives information from the sensors 100 and recognizes vehicle-outside environment information of the vehicle 10. The vehicle-outside environment information includes a state of a target, a road condition, an ambient brightness, and so forth. Information on a target includes a relative position and a relative velocity of the target relative to the own vehicle, an attribute of the target (e.g., type and direction of movement), and so forth. Examples of the type of the target include other vehicles, pedestrians, roads, and road lane marking. The road information includes information on the shape of the road itself. The information on the road shape includes the shape of a traveling route (e.g., linear, curve, and curvature), a traveling route width, the number of lanes, the width of each lane, and so forth.

The recognizer 51 combines images of the outside of the vehicle captured by the cameras 101 and a recognition result of the target with information such as a relative distance from the target obtained by the radars 102, and creates a 3D map showing a vehicle-outside environment. Based on the created 3D map, the recognizer 51 creates a 2D map for calculating a travel route of the vehicle 10.

Based on the 2D map created by the recognizer 51, the route calculator 52 calculates a travel route of the vehicle 10. More specifically, based on the 2D map, the route calculator 52 calculates a travel route for avoiding an obstacle recognized by the recognizer 51. The route calculator 52 calculates a plurality of candidate routes by a state lattice method, for example, and based on a route cost, selects one or more candidate routes from these candidate routes. The routes may be calculated by other techniques.

The vehicle motion manager 53 determines target motion of the vehicle for following a calculated travel route, and calculates a driving force, a braking force, and a steering angle for achieving the determined target motion. The vehicle motion manager 53 generates a target signal indicating target states of the calculated driving force, braking force, and steering angle, that is, a driving force, a braking force, and a steering angle to be obtained by each basic device. The central ECU 50 transmits the generated target signal to the zone ECUs 60, as a digital signal of the predetermined protocol described above, via the backbone network MNW.

The body-related manager 54 generates control signals to body-related devices not related to any of driving control, braking control, and steering control of the vehicle 10, based on the recognized vehicle-outside environment information and the calculated travel routes. For example, if the recognizer 51 recognizes that the surroundings are dark, the body-related manager 54 generates a control signal to be sent to the headlamp 31 so as to turn on the headlamp 31, or if a window is open when the vehicle enters a tunnel, the body-related manager 54 generates a control signal to be sent to the P/W control device 21 so as to close a window. These control signals of the body-related device are also output as digital signals of the predetermined protocol described above.

The body-related manager 54 estimates a passengers condition in the cabin by using a learned model generated by deep learning, based on information obtained by sensors for detecting the passenger condition. The passengers condition refers to a physical condition or feeling of a passenger. Examples of the physical condition of the passenger include healthy, mild fatigue, poor physical condition, and decreased consciousness. Examples of the passengers feeling include fun, normal, bored, frustrated, and unpleasant. The body-related manager 54 generates control signals in consideration of the passengers physical condition and/or the passenger's feeling. For example, if it is estimated that the temperature in the cabin is high and the passenger feels ill, the body-related manager 54 actuates an air conditioner and/or actuates the P/W control device 21 to open a window.

Each zone ECU 60 includes a communication port for connection to the backbone network MNW (hereinafter referred to as a backbone port) and a plurality of device-side communication ports for signal input/output to/from onboard devices. The backbone port is, for example, a port conforming to the Ethernet protocol. The central ECU 50 and each of the zone ECUs 60 are connected to each other, and the zone ECUs 60 are connected to one another by, for example, Ethernet communication cables. The zones may be defined in any manner, and if the number of zones varies, the number of zone ECUs 60 varies accordingly. A plurality of zone ECUs 60 may be disposed in one zone.

In this embodiment, the zone ECU 60 disposed in the right front of the vehicle will be referred to as a first zone ECU 60. An example of the first zone ECU 60 will be described below.

As illustrated in FIG. 2, the first zone ECU 60 includes a protocol converter 61, a first signal converter 62, a second signal converter 63, and a third signal converter 64. The first zone ECU 60 includes a backbone port 65. The first zone ECU 60 includes communication ports 66a through 66c and 66e through 66k as device-side communication ports to be connected to the device-side network. The protocol converter 61, the first signal converter 62, the second signal converter 63, and the third signal converter 64 are examples of the first interface conversion device.

The communication ports 66a through 66c are general-purpose digital communication ports, and onboard devices conforming to a CAN protocol can be connected to these ports. The communication ports 66e through 66f are general-purpose analog output ports, and the left and right headlamps 31 and 31 and an analog-driven actuator are connected to these ports. The communication ports 66e and 66f are general-purpose digital input ports, and a digital switch 106, for example, is connected to these ports. The communication ports 66j and 66k are general-purpose analog input ports, and an analog sensor, for example, is connected to these ports. Although not specifically shown, the zone ECUs 60 include general-purpose ports of the same type. As described above, the communication ports of the same type are provided in the zone ECUs 60 and these communication ports are configured to have general-purposes so that a network system avoiding dedication and complication of the zone ECUs can be achieved. In a case where the configuration of the onboard network changes, such as a case where an onboard device to be connected is changed to another onboard device, for example, modification of the zone ECUs 60 can be minimized.

The zone ECU 60 (first zone ECU 60 in this example) and a peripheral configuration thereof will be specifically described below.

The protocol converter 61 includes: (a) the function of relaying communication between the central ECU 50 connected to the backbone port 65 and the zone ECU 60, that is, a relay function of the backbone network MNW; (b) the distribution function of extracting and distributing a signal for an onboard device connected to the own ECU from backbone network signals; and (c) the collection function of collecting data to be transmitted from the onboard device connected to the own ECU to the central ECU 50 and/or other zone ECUs 60. The (a) relay function is not significantly related to the technique disclosed here, and thus, will not be described in detail here, and the (b) distribution function and the (c) collection function will be mainly described below.

The protocol converter 61 receives a backbone network signal through the backbone port 65 and performs protocol conversion on this signal. For example, a backbone network signal conforming to an Ethernet protocol is subjected to protocol conversion to be converted to a digital conversion signal conforming to, for example, a controller area network (CAN) protocol, a CAN with flexible data-rate (CAN-FD) protocol, or a local interconnect network (LIN) protocol. The protocol conversion herein refers to an idea including data length conversion performed between a CAN-FD protocol and a CAN.

The protocol converter 61 extracts signals for onboard devices connected to the communication ports 66a through 66c from the digital conversion signals described above, and outputs the extracted signals from the communication ports 66a through 66c. The protocol convener 61 extracts signals for onboard devices connected to the communication ports 66e through 66g from the digital conversion signals described above, and outputs the extracted signals to the first signal converter 62. The protocol converter 61 extracts signals for onboard devices connected to the communication ports 66h and 66i from the digital conversion signals described above, and outputs the extracted signals to the second signal converter 63. The protocol converter 61 extracts signals for onboard devices connected to the communication ports 66j and 66k from the digital conversion signals, and outputs the extracted signals to the third signal converter 64.

The communication port 66a is connected to, for example, an engine ECU 41, which is connected to the driving-system device 11. The communication port 66b is connected to, for example, an EPS-EPC 42, which is connected to the EPS device 12. The communication port 66c is connected to, for example, the P/W control device 21, which is connected to a P/W switch 21c and a P/W motor 21d. The communication port 66c is connected to, for example, the key less entry device 22. The communication ports 66e and 66f are respectively connected to, for example, the left and right headlamps 31 and 31. The communication port 66g is connected to, for example, a signal conversion device 32, which is connected to an analog-driven actuator 33. The communication ports 66h and 66i are respectively connected to, for example, the digital switches 106 and 106. The communication port 66j is connected to, for example, an analog sensor 107. The communication port 66k is connected to, for example, a signal conversion device 35, which is connected to an analog sensor 108. The signal conversion device 35 is an example of a second interface conversion device.

The engine ECU 41 includes a first arithmetic unit 41a and a first signal processing unit 41b. The first arithmetic unit 41a calculates a controlled variable of the driving-system device 11 such that the driving-system device 11 obtains a target driving force, based on a signal of a target driving force transferred from the central ECU 50. Examples of the controlled variable of the driving-system device 11 include an opening degree of a throttle valve and an injection timing of a fuel injection valve. The first signal processing unit 41b generates and outputs an analog signal to each actuator of the driving-system device 11 so as to obtain the controlled variable calculated by the first arithmetic unit 41a. With respect to apart of control of the driving-system device 11, the engine ECU 41 may be configured to generate a control signal of the driving-system device 11, irrespective of communication contents between the central ECU 50 and the engine ECU 41. For example, if an engine water temperature detected by an engine water temperature sensor is high and knocking might occur in the engine, the engine ECU 41 generates a control signal to retard an injection timing of a fuel injection valve or an ignition timing of an ignition plug without passing through the central ECU 50. As described above, the engine ECU 41 has a reflection control function of controlling the driving-system device 11 without passing through the central ECU 50. A sensor 110 used for such a reflection control function is not connected to the zone ECUs 60 but is directly connected to an onboard device side (to the engine ECU 41 in this embodiment).

The EPS-ECU 42 includes second arithmetic unit 42a and a second signal processing unit 42b. The second arithmetic unit 42a calculates a controlled variable of the EPS device 12 such that the EPS device 12 obtains a target steering angle, based on information of a target steering angle transferred from the central ECU 50. The controlled variable of the EPS device 12 is, for example, a current amount supplied to an electric motor for assistance. The second signal processing unit 42b generates and outputs an analog signal to the EPS device 12 so as to obtain the controlled variable calculated by the second arithmetic unit 42a. With respect to a part of control of the engine system 11, the EPS-ECU 42 may be configured to generate a control signal for the EPS device 12, irrespective of communication contents between central ECU 50 and the EPS-ECU 42. For example, in a case where the controlled variable of the steering angle greatly deviates from an actually measured value of the steering angle sensor, the EPS-ECU 42 generates a control signal to reduce the difference in the steering angle, without passing through the central ECU 50. As described above, the EPS-ECU 42 has the reflection control function of controlling the engine system 11 without passing through the central ECU 50. The sensor 111 for use in such a reflection control function is not directed to the zone ECU 60 but is directly connected to the onboard device side (the EPS-ECU 42 in this embodiment). For example, the EPS-ECU 42 is configured to directly acquire outputs of at least a steering angle sensor, a vehicle speed sensor, and an engine speed sensor, for example.

The P/W control device 21 includes a signal converter 21*a* and a third signal processing unit 21*b*. The signal converter 21*a* converts P/W opening/closing control information transferred from the central ECU 50 to a signal in a mode capable of being received by the P/W motor 21*d*, and outputs the converted signal as an opening/closing control signal to the P/W motor 21*d*. When a passenger of the vehicle operates the P/W switch 21*c* for actuating the power window device, the third signal processing unit 21*b* outputs an opening/closing control signal based on the operation of the P/W switch 21*c* to the P/W motor 21*d*. Operation information of the P/W switch 21*c* is transferred to the central ECU 50 via the first zone ECU 60. When the third signal processing unit 21*b* receives a switch signal from the P/W switch 21*c*, the third signal processing unit 21*b* controls the P/W motor 21*d* based on the switch signal from the P/W switch 21*c*, independently of a control signal from the central ECU 50. As described above, the sensors or other devices for acquiring information having priority to an instruction from the central ECU 50 are not connected to the first zone ECU 60 but are directly connected to the onboard device side (the P/W device 21 in this embodiment). The signal converter 21*a* is an example of a second interface device. The P/W switch 21*c* is an example of a sensor. The P/W motor 21*d* is an example of an actuator. The third signal processing unit 21*b* is an example of an autonomous control circuit.

The key less entry device 22 incorporates a function (fourth signal processing unit 22*a*) of outputting a signal to an actuator 22*b* (e.g., door lock mechanism). This is because the key less entry device 22 is used only for locking and unlocking a door lock based on an on/off signal, and a signal itself is a simple signal.

The key less entry device 22 directly receives a signal concerning only actuation of the key less entry device 22 among signals from the sensors 100. Specifically, the key less entry device 22 includes the fourth signal processing unit 22*a*, the actuator 22*b*, and a receiver 22*c* that receives a signal from a portable terminal 104 held by a passenger. When receiving a control signal for actuating the actuator 22*b* from the central ECU 50, the fourth signal processing unit 22*a* converts the control signal to an analog signal. The fourth signal processing unit 22*a* transfers the converted analog signal to the actuator 22*b* and actuates the actuator 22*b*. A control signal from the central ECU 50 is a control signal generated by the central ECU 50 based on vehicle-outside environment information obtained from outputs of the sensors 100 and concerning an external environment of the vehicle. This control signal is a control signal for actuating the key less entry device 22, independently of a signal from the portable terminal 104 described above.

Figure 3:
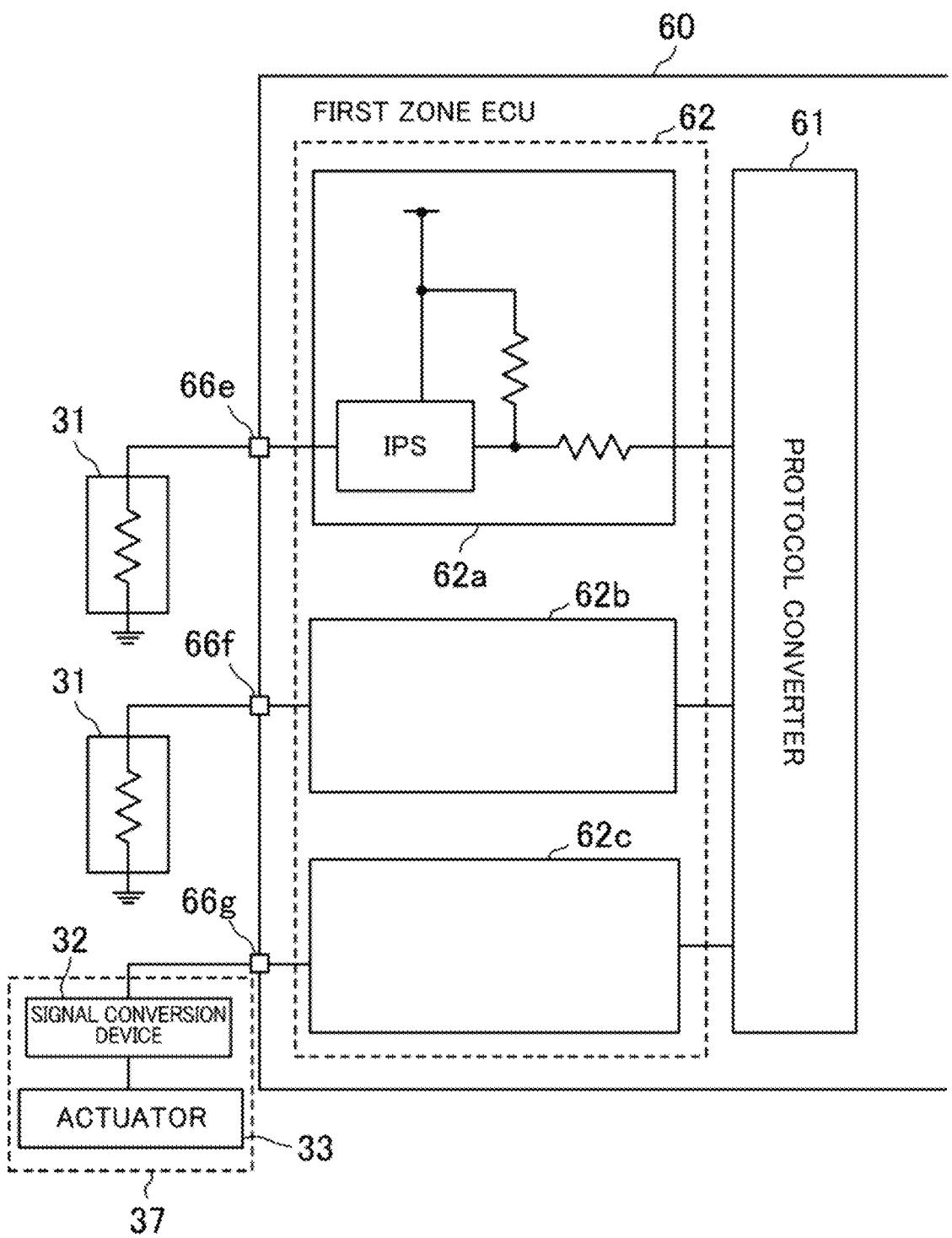
FIG. 3 is a circuit diagram illustrating an example of a signal converter.

FIG. 3 is an example of a circuit configuration of the first signal converter 62. The first signal converter 62 includes a plurality of (three in FIG. 3) analog output circuits having the same configuration. In FIG. 3, the first signal converter 62 includes an analog output circuit 62*a* connected to the communication port 66*e*, an analog output circuit 62*b* connected to the communication port 66*f*, and an analog output circuit 62*c* connected to the communication port 66*g*. Although FIG. 3 does not show the output circuits 62*b* and 62*c*, the analog output circuits 62*a* through 62*c*, for example, are the same circuit. Here, the "same configuration" includes a circuit configuration in which parameters of elements and circuits, such as a driving capacity, a resistance value, and a capacitance value of a transistor, are different from one another, as well as completely the same circuit configuration including the same parameters of elements and circuits. The "same configuration" also includes a case where configurations for obtaining a main function are the same. As the output circuit, a circuit having high versatility is preferably employed, for example. The same holds for a digital input circuit, an analog input circuit, and a digital output circuit described later.

The analog output circuits 62*a* and 62*b* receive control signals (on/off control signals) of the headlamps 31 extracted by the protocol converter 61, and based on the control signals, convert the control signals to analog signals and output the analog signals. The output signals from the analog output circuits 62*a* and 62*b* are directly input to the headlamps 31. In the example of FIG. 3, the interposition of an IPS device enables on/off control of the left and right headlamps 31 based on the output signals from the analog output circuits 62*a* and 62*b*. That is, the headlamps 31 receive analog control signals for actuation, directly from the first zone ECU 60. As in the headlamps 31 in this example, an actuator capable of being directly driven by a general-purpose output circuit is directly connected to the first signal converter 62. That is, such an actuator is directly connected to the communication port 66*e* through, for example, a connector (not shown). The configuration of the analog output circuit is not limited to the configuration illustrated in FIG. 3, and may be other circuit configurations.

In a manner similar to the analog output circuits 62*a* and 62*b*, examples of the onboard device configured to be driven by an output circuit having a general-purpose configuration include a horn such as a burglar horn (anti-theft horn), a power outlet (voltage converter), a glove box illumination, a door illumination, a license lamp, a shift lock solenoid, a rear fog lamp, a high mounted stop lamp, a cargo lamp, an E-latch motor, a fuel lid opener, a canister, and a rear wiper.

The analog output circuit 62*c* receives a control signal for controlling the actuator 33 extracted in the protocol converter 61, converts the control signal to an analog signal, and outputs the analog signal from the communication port 66*g*. As described above, the signal conversion device 32 is interposed between the communication port 66*g* and the actuator 33. The signal conversion device 32 has the function of converting the analog signal output from the analog output circuit 62*c* to a signal in a mode capable of driving an actuator in a later stage. The signal conversion device 32 is an example of a second interface device.

Examples of an onboard device having difficulty in driving with a general-purpose output circuit and preferably having interposition of the signal conversion device 32 include a rear combination lamp, an electric fan of a PWM control method, an inverted wiper motor, an air conditioner actuator, a blower motor of a PWM control method, a PTC heater, an engine spark control (ESCL), an inner mirror, an indicator assy, a rear shade, a backup siren, a sunroof motor, and a change lever assy.

FIG. 4 illustrates an example of the circuit configuration of the second signal converter 63. The second signal converter 63 includes a plurality of (two in FIG. 4) digital input circuits having the same configuration. Specifically, in FIG. 4, the second signal converter 63 includes a digital input circuit 63a connected to the communication port 66h, and a digital input circuit 63b connected to the communication port 66i. The configuration of the digital input circuit is not limited to the configuration of FIG. 4, and may be other circuit configurations.

The digital input circuit 63a is configured to transfer an input signal from the digital switch 106 connected to the communication port 66h, to the protocol converter 61. Similarly, the digital input circuit 63b is configured to transfer an input signal from the digital switch 106 connected to the communication port 66i, to the protocol converter 61.

FIG. 5 illustrates an example of the circuit configuration of the third signal converter 64. The third signal converter 64 includes a plurality of (two in FIG. 4) analog input circuits having the same configuration. Specifically, the third signal converter 64 includes an analog input circuit 64a connected to the communication port 66j, and an analog input circuit 64b connected to the communication port 66k.

The analog input circuit 64a is configured to transfer an input signal (e.g., detection signal) from the analog sensor 107 connected to the communication port 66j, to the protocol converter 61. The protocol converter 61 transfers an output result of the analog sensor 107 to the central ECU 50 and other zone ECUs.

Examples of the onboard device connectable to an input circuit having a general-purpose configuration, such as the digital input circuit 63a or 63b or the analog input circuit 64a, include sensors such as an outdoor air temperature sensor, a hood switch, a horn switch, an EVA sensor, an in-car sensor, and an accelerator pedal sensor, and switches such as a brake switch, a manual mode switch, a seatbelt switch, a cargo switch, a mode switch, an EPB switch, a parking switch, a tank internal pressure sensor, and a centralized lock switch.

The analog input circuit (4b is configured to transfer an input signal (e.g., detection signal) from the analog sensor 108 to the protocol converter 61 through the signal conversion device 35. The protocol converter 61 transfers an output result of the analog sensor 108 to the central ECU 50 and other zone ECUs. The signal conversion device 35 is configured such that the analog sensor 108 can be connected to the common analog input circuit 64b in a case where the analog sensor 108 requires an additional terminal and/or an additional circuit in addition to the common analog input circuit 64b.

Examples of an onboard device for which processing is difficult with a general-purpose input circuit and interposition of the signal conversion device 35 is recommended, such as the case of the analog sensor 108, include a current sensor for a battery, an ultrasonic sensor, an intrusion sensor, a rain sensor, a sunroof sensor, a steering angle sensor, a combination switch, a cluster switch, an air conditioner switch, a camera, and an ADAS radar.

As described above, in this embodiment, the common general-purpose communication port is provided to the zone ECUs 60, and a predetermined onboard device connectable to this general-purpose communication port (corresponding to a first onboard device) is directly connected to the general-purpose communication port. In the case of a model different from an input/output circuit of the general-purpose communication port, such as a case where a special I/O is needed, an interface conversion device that performs interface conversion as in a signal conversion circuit is interposed. Accordingly, specialization and complication of the zone ECUs can be avoided. Accordingly, versatility of zone ECUs disposed at various locations in the vehicle can be maximized, and at least one of pans, members, circuit configurations, or specifications, for example, can be made common among the zone ECUs.

In the embodiment described above, the functions mounted on the zone ECUs 60 are functions as hub devices such as protocol conversion. For functions specific to onboard devices and/or onboard devices for use in controlling reflective operation, an ECU having an interface conversion function is interposed between the zone ECU 60 and the onboard devices. As described above, the zone ECUs are not provided with interfaces dedicated to onboard devices so that modification of the zone ECUs 60 by, for example, a change of connection target of the onboard device and/or a change of function of the onboard device itself can be minimized.

In the embodiment, the engine ECU 41 and the EPS-EPC 42 are described as examples of the ECU having the interface conversion function described above, but the disclosure is not limited to these examples. Examples of the ECU include an ECU for dynamic stability control (DSC), an ECU for tilt and telescopic, an ECU for an air bag, an ECU for power-train control module (PCM), an ECU for a TCM, an ECU for a 4WD unit, an ECU for a PLG, an ECU for an OHC, an ECU for an LFU, an ECU for a seat, an ECU for a connectivity master unit (CMU), and an ECU for a tuner amplifier unit (TAU). To the ECU for a DSC, a wheel speed sensor, a brake oil sensor, a Mastervac pressure sensor, a boost sensor, and a clutch stroke sensor, for example, are connected as onboard devices. To the ECU for a tilt and telescopic, a tilt and telescopic motor/sensor/switch, for example, is connected as onboard devices. To the ECU for a PCM, a brake switch and an air flow sensor, for example, are connected as onboard devices. To the ECU for a 4WD unit, a coupling assy and an oil temperature sensor, for example, are connected as onboard devices. To the ECU for a PLG, a PLG buzzer, a PLG motor/sensor/switch, a closer motor/switch, a touch sensor, and a room spot lamp, for example, are connected as onboard devices. To the ECU for an OHC, a center room lamp, a vanity mirror illumination, and a sunroof switch, for example, are connected as onboard devices. To the ECU for an LFU, an LF antenna and a door handle switch, for example, are connected as onboard devices. To the ECU for a seat, a seat warmer/sensor and a power seat motor/sensor/switch, for example, are connected as onboard devices.

In the embodiment described above, the central ECU 50 may also serve as the function of the zone ECUs 60. In this case, an SSB switch, an accelerator pedal sensor, a not parking switch, a brake switch, and an ESCL, for example, are directly connected as onboard devices to the central ECU 50.

In the embodiment, each of the signal conversion devices 32 and 35 may include a regulator circuit disposed between a communication port and a predetermined onboard device.

In this case, onboard devices having different driving capacities can be connected to a general-purpose port.

In the embodiment described above, the signal conversion device 35 is shown as a separate device from the analog sensor 108. The signal conversion device 35 and the analog sensor 108 may be separately configured or may be configured as one unit (see 38 in FIG. 5). The same holds for the signal conversion device 32 and the actuator 33 (see 37 in FIGS. 2 and 3). As described above, the signal conversion device 32 and the signal conversion device 35 are examples of a second interface device. The analog sensor 108 and the actuator 33 are examples of a second onboard device.

The forgoing embodiment is merely illustrative, and should not be construed to limit the scope of the present disclosure. Further, the scope of the present disclosure is defined by the claims, and all modifications and changes belonging to the equivalent scope of the claims are within the scope of the present disclosure.

INDUSTRIAL APPLICABILITY

The technique disclosed here can avoid complication of relay devices and maximize versatility of the relay devices in a vehicle control system, and thus, is significantly useful.

The invention claimed is:

1. A vehicle onboard network system comprising:
a central control device configured to centrally manage operation of a vehicle;
a plurality of relay devices connected to the central control device in a daisy chain manner via a backbone network through which a digital signal of a predetermined protocol is transmitted, wherein
each of the relay devices includes
a backbone-side communication port connected to the backbone network,
a plurality of device-side communication ports connected to onboard devices, and
one or more first interface conversion devices configured to perform interface conversion between the backbone-side communication port and the plurality of device-side communication ports,
some of the plurality of device-side communication ports are a plurality of general-purpose communication ports to which an input circuit and/or output circuit of a type identical to a type of another relay device is connected, and
one or more a general-purpose onboard devices are directly connected to a part of the plurality of general-purpose communication ports, whereas one or more specific onboard devices are connected to another part of the plurality of general-purpose communication ports via one or more second interface conversion devices, the one or more second interface conversion devices being configured to perform interface conversion.

2. The vehicle onboard network system according to claim 1, wherein
each of the one or more first interface conversion devices includes an output circuit configured to convert the digital signal to an analog signal and to output the analog signal to the one or more general-purpose communication ports,
and
the second interface conversion device includes one or more regulator circuits each disposed between one of the general-purpose communication ports and the specific onboard device.

3. The vehicle onboard network system according to claim 1, wherein
the second interface conversion device and the specific onboard device are configured as one unit.

4. The vehicle onboard network system according to claim 1, wherein
the specific onboard device includes a sensor and an actuator, and
the vehicle onboard network system further comprises an autonomous control circuit configured to autonomously control the actuator based on an output signal from the sensor with respect to a predetermined specific operation.

5. The vehicle onboard network system according to claim 1, wherein
the first interface conversion device includes
a protocol converter having an extraction function of receiving the digital signal via the backbone-side communication port and extracting, from the digital signal, data transmitted to the one or more general-purpose onboard devices and/or the one or more specific onboard devices and a collection function of collecting data to be output from the one or more general-purpose onboard devices and/or the one or more specific onboard devices to the backbone-side communication port,
one or more general-purpose output circuits each configured to output data extracted by the extraction function from one of the plurality of device-side communication ports corresponding to the data, the one or more general-purpose output circuits having the same configuration as that of the other relay devices, and
one or more input circuits each configured to receive data to be collected by the collection function from one or more of the plurality of device-side communication ports and to transmit the received data to the protocol converter, the one or more input circuits having the same configuration as that of the other relay devices.

* * * * *